May 21, 1929.　　J. A. MARKSTRUM　　1,713,847
ROTARY CUTTER
Filed April 22, 1927
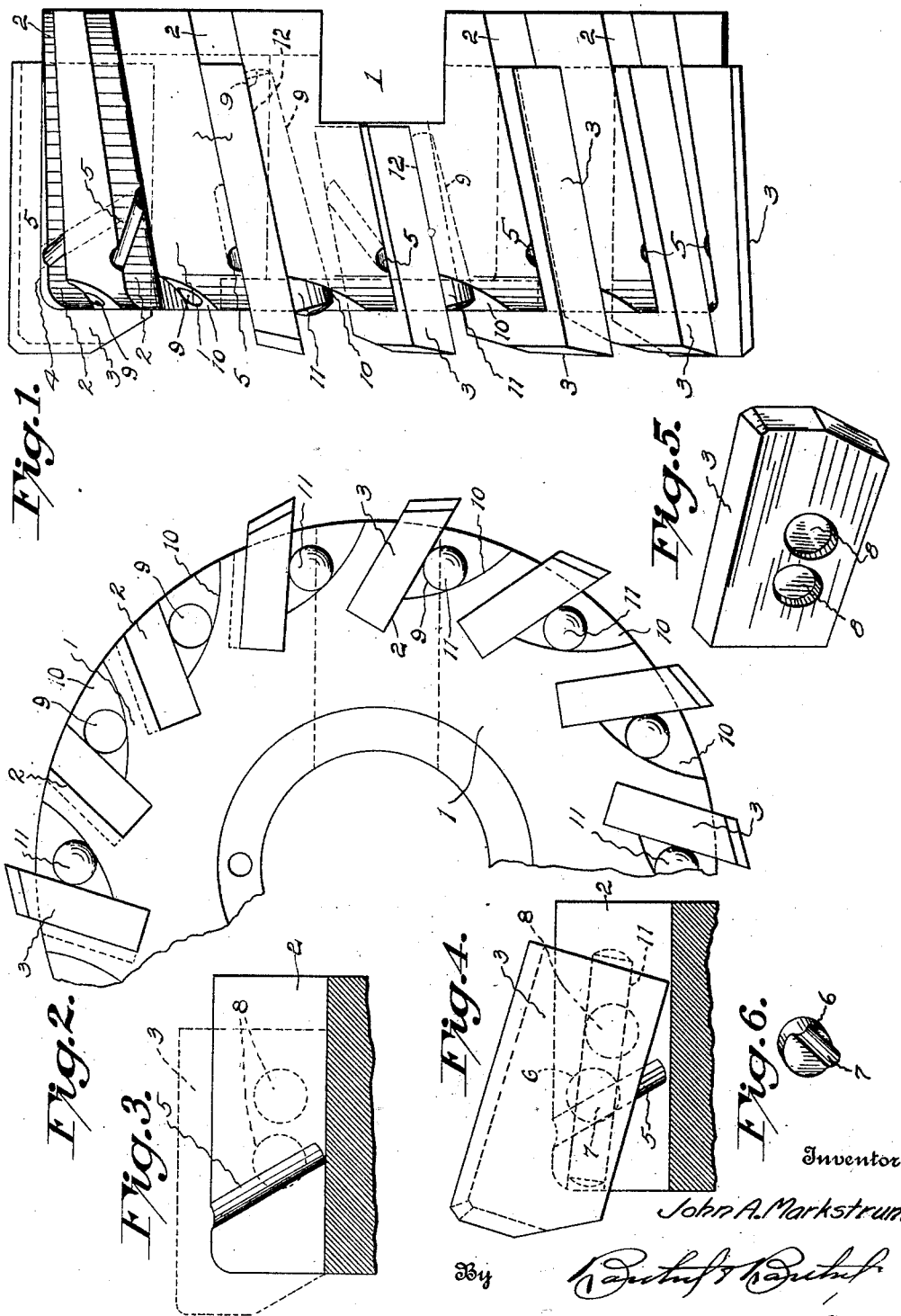
Inventor
John A. Markstrum
By
Attorney Patented May 21, 1929.

1,713,847

UNITED STATES PATENT OFFICE.

JOHN A. MARKSTRUM, OF DETROIT, MICHIGAN, ASSIGNOR TO CONTINENTAL TOOL WORKS, OF DETROIT, MICHIGAN, A CORPORATION OF MICHIGAN.

ROTARY CUTTER.

Application filed April 22, 1927. Serial No. 185,716.

The present invention pertains to a rotary cutter and is directed more particularly to a novel means for locking detachable blades in a cutter head.

More specifically, the invention provides a key connection between the blade and the cutter head, in addition to the wedge or friction holding device which is usually used to hold the blades in the head, and this key serves as a stop to prevent displacement of the blade under heavy strains. This key is in the form of a rib projecting from an inset mounted in the blade with its rib received in an appropriate slot cut in the head. The invention is further characterized by adjustability of this key lengthwise of the blade whereby several positions of the blade with respect to the head may be obtained.

The invention is fully disclosed in the following description and in the accompanying drawing, in which—

Figure 1 is a side elevation of a portion of a cutter head having blades assembled therein and illustrative of the invention;

Fig. 2 is an edge elevation thereof;

Fig. 3 is a sectional detail showing a transverse section through a portion of the head lengthwise of one of the blade slots therein;

Fig. 4 is a detail similar to that of Fig. 3 illustrative of the tilting of a blade in its slot;

Fig. 5 is a perspective view of a blade detached; and

Fig. 6 is a perspective view of a retaining key.

Reference to these views will now be made by use of like characters which are employed to designate corresponding parts throughout.

The cutter head 1 is of cylindrical construction and has a peripheral series of slots 2 cut inwardly from the curved surface thereof in a non-radial direction. The form and location of these slots is immaterial to the present invention which relates more particularly to the means for retaining cutting blades in said slots.

It will be seen from Figure 1 that the slots 2 are somewhat inclined transversely of the head in the direction of its rotation and receive blades 3 suitably fitted therein. One of the walls of each slot 2 is formed with a groove 5 in its face extending diagonally across the same with its outer end opening through the peripheral face of the head and its inner end terminating at the bottom of said slot, said groove being preferably semi-circular in cross section, and inclined to the plane of rotation of the head.

Each blade 3 has a countersink or circular recess 8 in one side face thereof to receive a disk or button 6 having a rib 7 extending transversely of its outer face, which rib is of a form to fit within said groove 5 when the blade 3 is inserted in its slot and rigidly hold the blade against endwise movement therein. Because of the inwardly inclined or diagonal direction of this groove 5, cutting pressure on the blade tends to force it inwardly of its slot in the head toward the bottom of said slot. The rib 7 is preferably unsymmetrical with respect to the disk 6, that is it extends across the face of the disk at one side of the axis thereof so that by a rotative movement of the disk in its countersink or recess, said rib may be positioned at the opposite side of said axis, and thus provide for longitudinal positioning of the blade in different positions within its slot in order that it may project to a greater or lesser degree from the head, laterally thereof, and thus provide for adjustment as the blade is worn away by successive grinding operations. In order to provide additional adjustments of the blade 3 in its slot 2, the blade may have one or more additional recesses or countersinks 8 adapted to receive selectively, the disk 6.

In the side wall of each slot 2 opposite the wall having the groove 5, is a bore 9 extending longitudinally of the slot with one side of said bore cutting through the face of the wall of the slot, so that when a wedge pin 11 is inserted in said bore, a flattened or tapered side 12 of said pin will contact the adjacent side face of the blade in the slot and, when driven in, will provide a wedge acting against the blade to force it into firm contact with the opposite wall of the slot and securely hold the blade against movement radially of the head out of its slot. The peripheral angle of the head is preferably cut away or notched as at 10, at the outer end of each bore 9 so that the outer end of the pin 11 will be exposed when the pin is fully seated and will not project beyond the side face of the head. This method of securing cutter blades in a slotted head by means of wedge members forms no part of the present invention except as securing means cooperating with the particular positive stop means embodying the present invention for holding the blades against endwise movement and permitting ready removal and adjustment thereof.

As the locking rib 7 is carried by the disk which is free to rotate within its recess in the blade, said blade is made readily removable as it may be tilted in its slot as indicated in Figure 4, and pried out, and further, this particular arrangement of rib and slot holding means with the rib free to change its angular relation to the blade, permits of setting the blade in any desired position in its slot and securing the same in that position by placing blocks or shims beneath the blade within its slot in the head, the blade being held by said rib against longitudinal movement in its slot no matter in what angular position it is set in its slot, and positioning of the blade longitudinally, is provided for by the arrangement of the rib 7 relative to the axis of the disk and by providing a plurality of recesses 8 in the blade, so that the disk may be placed in either of said recesses.

Although a specific embodiment of the invention has been illustrated and described, it will be understood that various alterations in the details of construction may be made without departing from the scope of the invention as indicated by the appended claims.

What I claim is:—

1. In a cutter head, a blade inserted therein, a retaining member rotatively mounted in said blade, and an eccentric projection on said member, said head being formed adjacent said blade to receive said projection.

2. In a cutter head having a peripheral slot, a blade in said slot, a retaining member mounted in said blade for removal and insertion in another position, and a rib formed unsymmetrically on said member, a side wall of said slot being formed with a groove extending transversely of said wall to receive said rib.

3. In a cutter head, a blade inserted therein, a disk mounted in a recess in said blade, a rib on said member arranged eccentrically thereof, and a groove in said head adjacent said blade to receive said rib.

4. In a cutter head, a blade inserted therein, and a disk mounted in said blade and having a portion projecting from one face thereof and extending thereacross laterally of the axis of said disk, said head being formed with a groove to receive said projecting portion of said disk.

5. In a cutter head, a blade inserted therein, a retaining member carried by said blade with a surface thereof flush with a surface of the blade, and a projection extending across said surface of said retaining member and fitted in said head, said retaining member being rotatively adjustable to change the position of said projection relative to said blade longitudinally thereof.

6. In a cutter head having a peripheral slot with a groove in a side wall of said slot extending across said wall inwardly from the periphery of said head, and a retaining member rotatably mounted in a side face of said blade and formed with a transverse rib to engage said groove.

7. A cutter head having a peripheral slot and a groove in a side wall of said slot extending inwardly across said wall, a blade in said slot formed with a plurality of recesses in a side thereof, and a retaining member for rotative mounting in any one of said recesses and having a rib extending unsymmetrically across said member to engage in said groove.

In testimony whereof I affix my signature.

JOHN A. MARKSTRUM.